US008689216B2

(12) United States Patent
Funane

(10) Patent No.: US 8,689,216 B2
(45) Date of Patent: Apr. 1, 2014

(54) INFORMATION PROCESSING APPARATUS AND METHOD THEREOF

(75) Inventor: Nao Funane, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1526 days.

(21) Appl. No.: 11/866,405

(22) Filed: Oct. 2, 2007

(65) Prior Publication Data

US 2008/0104594 A1 May 1, 2008

(30) Foreign Application Priority Data

Nov. 1, 2006 (JP) ................................. 2006-298215

(51) Int. Cl.
*G06F 9/46* (2006.01)
*G06F 15/16* (2006.01)
*G06F 3/12* (2006.01)
*G06F 9/50* (2006.01)

(52) U.S. Cl.
CPC ............ *G06F 3/1237* (2013.01); *G06F 3/1239* (2013.01); *G06F 9/5011* (2013.01)
USPC ........................... 718/100; 718/104; 358/1.14

(58) Field of Classification Search
CPC .... G06F 3/1237; G06F 3/1239; G06F 9/5011
USPC ......... 718/100, 101, 102, 104; 358/1.14, 1.15
See application file for complete search history.

(56) References Cited

U.S. PATENT DOCUMENTS

| | | | | |
|---|---|---|---|---|
| 7,715,030 B2* | 5/2010 | Higashiura et al. | ........... | 358/1.14 |
| 8,457,297 B2* | 6/2013 | Hansen | .................... | 379/265.02 |
| 2004/0125398 A1* | 7/2004 | Aiyama | ........................ | 358/1.14 |
| 2004/0130743 A1* | 7/2004 | Nozato | .......................... | 358/1.14 |
| 2005/0022188 A1* | 1/2005 | Tameshige et al. | ........... | 718/100 |
| 2005/0275867 A1* | 12/2005 | Higashiura et al. | ........... | 358/1.14 |
| 2005/0275868 A1* | 12/2005 | Higashiura et al. | .......... | 358/1.14 |
| 2007/0231038 A1* | 10/2007 | Uchida | .......................... | 400/76 |
| 2007/0256077 A1* | 11/2007 | Zhong | .......................... | 718/104 |
| 2008/0137134 A1* | 6/2008 | Igarashi | ....................... | 358/1.15 |
| 2008/0186530 A1* | 8/2008 | Kurozasa | ..................... | 358/1.15 |

FOREIGN PATENT DOCUMENTS

JP 06-197209 A 7/1994
JP 2004-178306 6/2004

OTHER PUBLICATIONS

English Translation of JP 2004178306 A.*
Chinese Office Action dated Jul. 31, 2009 for Chinese Counterpart Application No. 200710167077.8.
Japanese Office Action dated Aug. 29, 2011 concerning Japanese Patent Application No. 2006-298215.

* cited by examiner

*Primary Examiner* — Emerson Puente
*Assistant Examiner* — Willy W Huaracha
(74) *Attorney, Agent, or Firm* — Fitzpatrick, Cella, Harper & Scinto

(57) ABSTRACT

Information of a user group used to distribute the execution result of a job of an image forming apparatus is held in a memory. The execution result of the job appended with result appropriating destination information required to specify a user group to which the execution result of the job is to be appropriated is received from the image forming apparatus. The execution result of the job is distributed to at least one user group specified by the result appropriating destination information appended to the received execution result of the job. Billing management of job execution associated with a plurality of groups can be adequately made.

12 Claims, 15 Drawing Sheets

FIG. 5

UPPER LIMIT SETTING

GROUP : Product 1-1

UNIT OF UPPER LIMIT
- ⦿ TOTAL PAGE COUNT
- ○ COLOR/MONOCHROME-DEPENDENT PAGE COUNT
- ○ CHARGE

UPPER LIMIT

TOTAL PAGES [ 2000 ] PAGES

COLOR/MONOCHROME-DEPENDENT
COLOR [ 0 ] PAGES
MONOCHROME [ 0 ] PAGES

CHARGE [ 0 ] YEN

[ OK ]  [ CANCEL ]

FIG. 9A

| ATTRIBUTE | VALUE |
|---|---|
| ID | G0000015 |
| name | System A |
| memberOf | G000005 |
| member | G0000712, G0000713 |
| limit | null |
| amount | null |
| ... | ... |

FIG. 9B

| ATTRIBUTE | VALUE |
|---|---|
| ID | G0021000 |
| name | FIRST SECTION |
| memberOf | G000008 |
| member | null |
| limit | 1000 |
| amount | 500 |
| ... | ... |

FIG. 11

| ATTRIBUTE | VALUE |
|---|---|
| ID | U0000001 |
| name | User001 |
| memberOf | G0000015, G0021000 |
| ... | ... |

INFORMATION PROCESSING APPARATUS AND METHOD THEREOF

BACKGROUND OF THE INVENTION

1. Field of the Invention

The present invention relates to information processing for managing the execution results of jobs of an image forming apparatus.

2. Description of the Related Art

Companies, schools, corporations, and the like have a demand to manage and limit the use of copying machines and printers. As a management unit, not only a user unit but also a group unit is required. That is, the upper limit of the amount of money and the upper limit of the number of pages are required to be set for each project or organization (to be referred to as a "group" hereinafter) to which the user belongs, and billing control, upper limit control, and result totaling are required to be executed. In order to meet such requirements, a technique that designates a group as a totaling destination for each print process, and executes billing and output control in accordance with the designated group to total the results is known.

However, in the above technique, when a user who belongs to a plurality of groups executes print processes associated with the plurality of groups, only one group can be designated, and designation of a group is left to user's judgment. For example, when a user who belongs to both projects A and B executes print processes associated with both the projects, the user designates either project. Even if the print contents remain the same, a given user may designate project A, and another user may designate project B. That is, the designation of a group depends on user's judgment. As a result, the billing control, upper limit control, and result totaling of print processes associated with a plurality of groups lack precision.

SUMMARY OF THE INVENTION

In one aspect, an information processing apparatus comprises: a holding section, arranged to hold information of a user group used to distribute an execution result of a job of an image forming apparatus; a receiver, arranged to receive, from the image forming apparatus, the execution result of the job appended with result appropriating destination information required to specify a user group to which the execution result of the job is to be appropriated; and a distributor, arranged to distribute the execution result of the job to at least one user group specified by the result appropriating destination information appended to the received execution result of the job.

In another aspect, an information processing method comprises the steps of: holding, in a memory, information of a user group used to distribute an execution result of a job of an image forming apparatus; receiving, from the image forming apparatus, the execution result of the job appended with result appropriating destination information required to specify a user group to which the execution result of the job is to be appropriated; and distributing the execution result of the job to at least one user group specified by the result appropriating destination information appended to the received execution result of the job.

According to these aspects, billing management of execution of jobs associated with a plurality of groups can be adequately done.

Further features of the present invention will become apparent from the following description of exemplary embodiments with reference to the attached drawings.

BRIEF DESCRIPTION OF THE DRAWINGS

FIG. 5 shows an example of an upper limit setting window;

FIGS. 9A and 9B show examples of group information held by the directory server;

FIG. 11 shows an example of user information held by the directory server;

DESCRIPTION OF THE EMBODIMENTS

Information processing according to embodiments of the present invention will be described in detail hereinafter with reference to the accompanying drawings.

First Embodiment

An information processing system that manages the execution results of jobs (to be referred to as a "result management system" hereinafter) according to this embodiment distributes results according to a result distribution manner set by a system administrator, and executes billing control, upper limit control, and result totaling. The result management system is implemented by result management software which runs to attain cooperative processes on an information processing apparatus such as a personal computer and the like (to be referred to as a "PC" hereinafter), and image forming apparatuses such as a multi-functional peripheral equipment (MFP), copying machine, printer, and the like, which are dispersed on a network. Printing results will be exemplified hereinafter as typical execution results of jobs. However, for example, other types of execution results of jobs such as scanning results of paper documents, use results of applications, and the like are also assumed.

[Arrangement]

Figure 1:
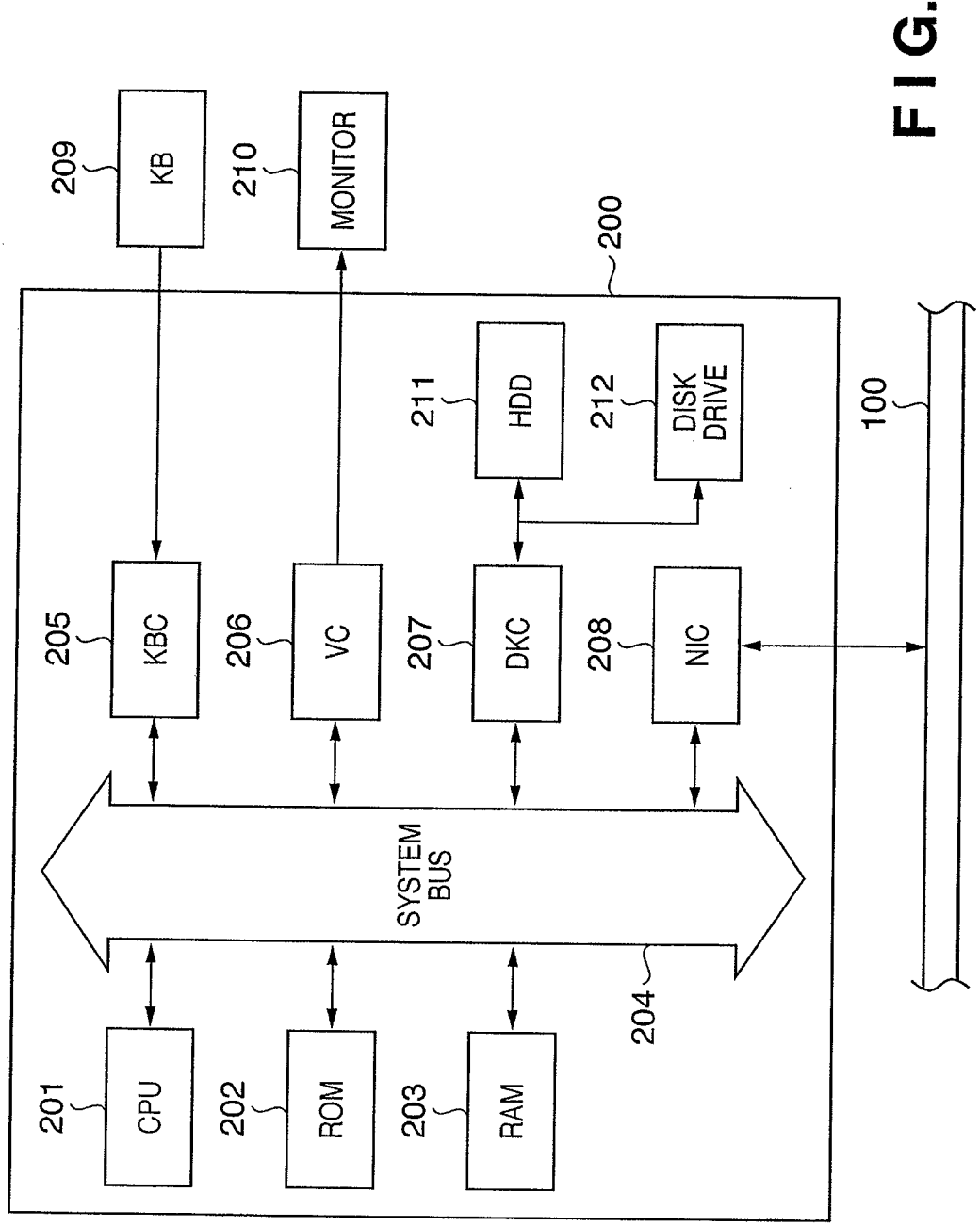
FIG. 1 is a block diagram showing the arrangement of each PC dispersed on a network.

FIG. 1 is a block diagram showing the hardware arrangement of a PC 200 or various servers dispersed on a network.

A microprocessor (CPU) 201 executes programs stored in a read-only memory (ROM) 202 and hard disk drive (HDD) 211 using a random access memory (RAM) 203 as a work memory to control various components to be described later via a system bus 204, and executes a result management process to be described later.

The HDD 211 as a nonvolatile memory stores various programs including an operating system (OS) and the aforementioned result management software, and data. The result management software is supplied from, for example, a storage medium such as a CD-ROM or the like which can be mounted on a disk drive 212. The CPU 201 accesses the HDD 211 and disk drive 212 via a disk controller (DKC) 207 to install the result management software and the like on the HDD 211.

The CPU 201 displays a user interface (UI) on a monitor 210 via a video card (VC) 206. The user gives instructions and inputs to the UI by operating a keyboard (KB) 209 and a pointing device such as a mouse or the like. The CPU 201 accepts the user's instructions and inputs via a keyboard controller (KBC) 205, and executes various processes according to the user's instructions and inputs.

The CPU 201 can communicate with other PCs, servers, an MFP 104, a printer, a copying machine, and the like on a network 100 via a network interface card (NIC) 208.

Figure 2:
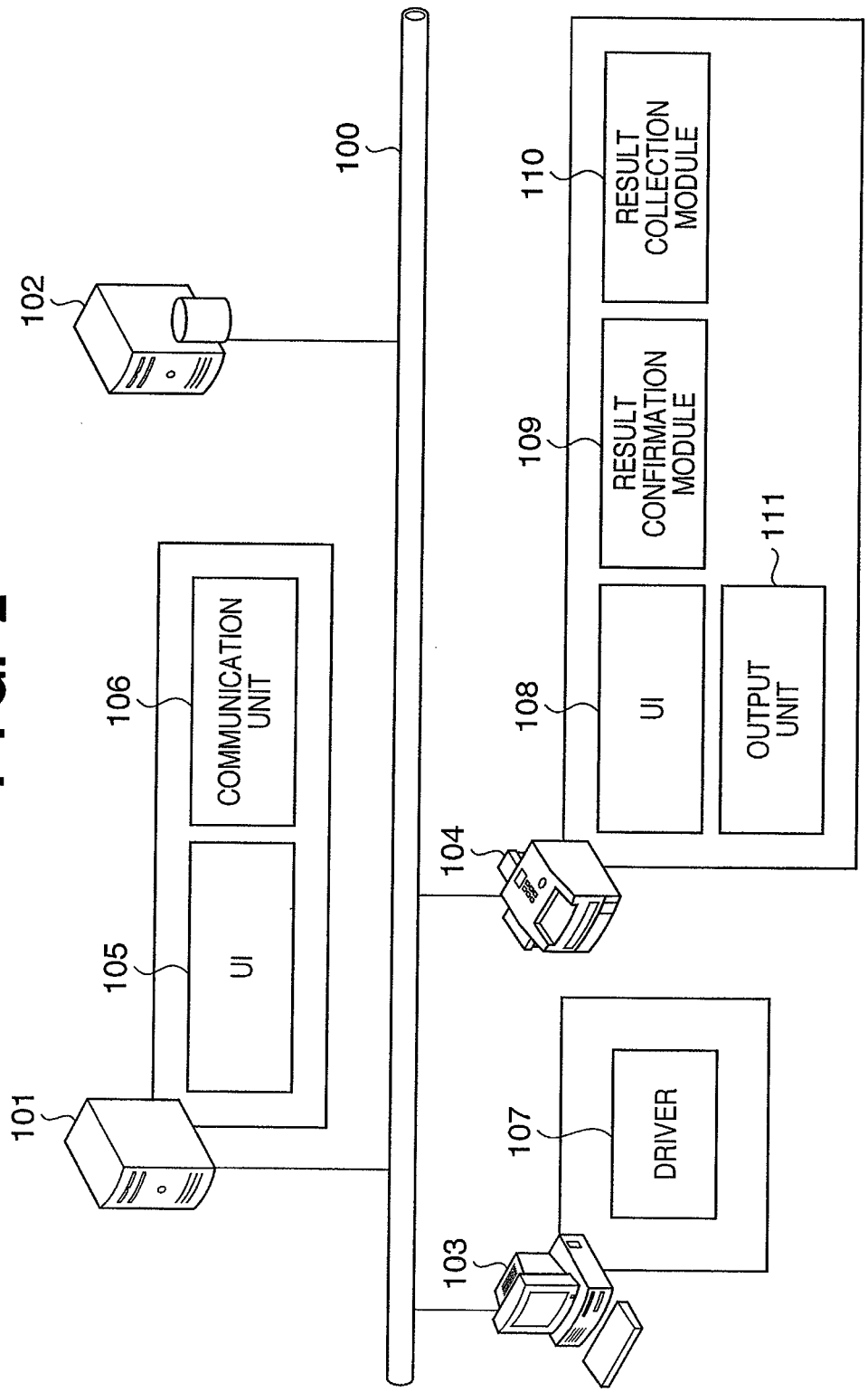
FIG. 2 is a block diagram showing the arrangement of a result management system.

FIG. 2 is a block diagram showing the arrangement of the result management system.

A result management server 101 is a PC having the same arrangement as that in FIG. 1, and serves as a server that executes billing control, upper limit control, and result totaling. The result management server 101 provides a UI 105. The system administrator of the result management system sets upper limits and a result distribution manner using the UI 105. A communication unit 106 of the result management server 101 communicates with a PC 103 which comprises a driver 107, MFP 104, and directory server 102 (to be described later).

The directory server 102 is a PC having the same arrangement as that in FIG. 1, and serves as a server which holds and manages user information and group information. Furthermore, the directory server 102 holds the upper limits and result distribution manner (to be described later), which are set by the system administrator using the UI 105 of the result management server 101, and amounts (to be described later) for respective groups. Note that the result management server 101 and directory server 102 may be implemented by a single PC. Therefore, for example, processes to be executed by the directory server 102 of those of respective steps in the flowcharts to be described later can be replaced by those of the result management server 101.

Figure 3:
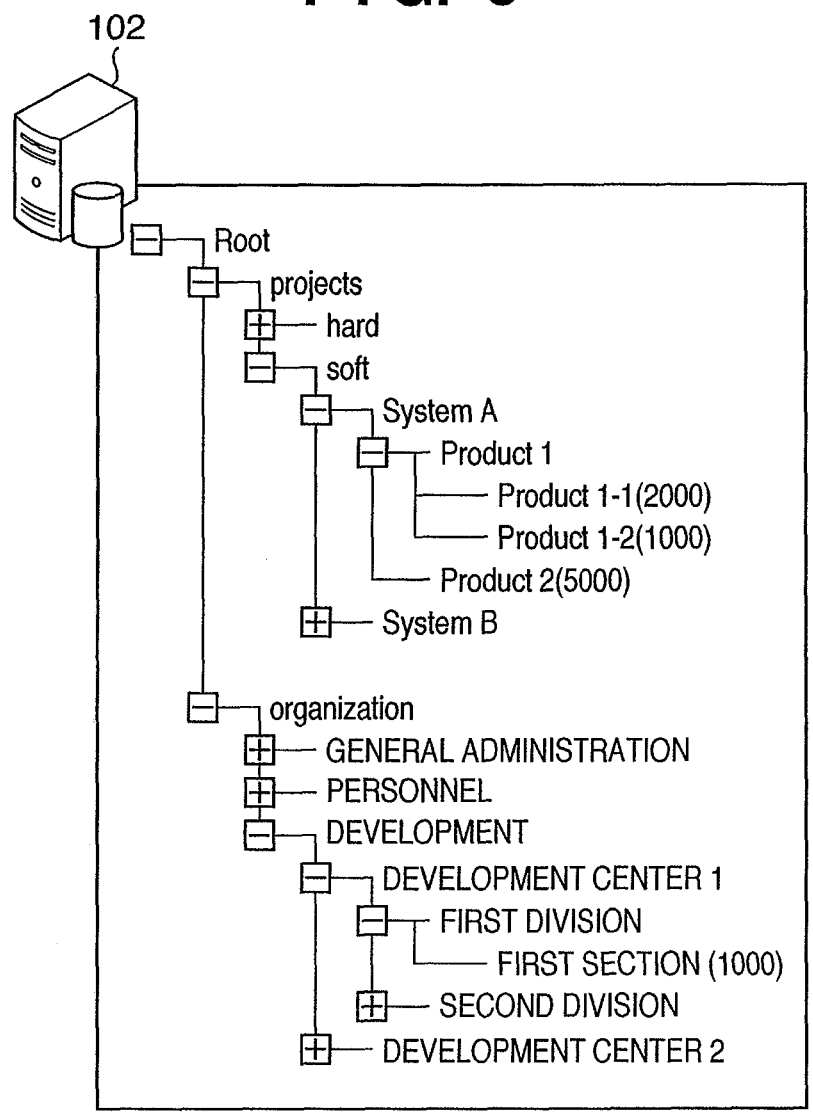
FIG. 3 shows an example of group information held by a directory server.

FIG. 3 shows an example of group information held by the directory server 102.

The directory server 102 manages information of groups, to which the execution results of jobs (e.g., printing results) of the MFP 104 are appropriated, using a tree structure. For example, group "System A" has lower groups such as "Product 1" and the like, and group "First Division" has a lower group "First Section". Note that printing results correspond to the numbers of printed pages, charges, points, and the like for respective printing attributes. The printing attributes indicate the qualities of print sheets, print sheet sizes, color/monochrome, and the like.

The user can belong to 0 or more groups. For example, user "User001" can be set to belong to "System A" and "First Section". The affiliation of the user is normally transmitted to lower groups. For example, when "User001" belongs to "System A", he or she also belongs to "Product 1", "Product 1-2", and "Product 2" as lower groups of "System A". However, management of group information is not limited to this. For example, it may be specified so that the user does not belong to all or some of lower groups of a group he or she belongs to.

Also, numerals in parentheses attached after the group names shown in FIG. 3 indicate upper limits (to be described in detail later) set for these groups.

A client 103 is a PC having the arrangement shown in FIG. 1, and serves as a user terminal. The driver 107 of the client 103 is a printer driver which issues print jobs to the MFP 104.

The MFP 104 has a scanner function, printer function, FAX function, and the like in addition to a copy function. A UI 108 of the MFP 104 is a user interface provided to an operation panel which allows the user to directly operate the MFP 104 upon using the copy function, FAX function, and the like. A result confirmation module 109 of the MFP 104 has a function of inquiring the result management server 101 of amounts upon execution of a print process. A result collection module 110 of the MFP 104 has a function of notifying the result management server 101 of the amount of the print process. Note that the amount indicates the quantities of resources consumed upon execution of a job in an image forming apparatus. For example, as the representative amount, the numbers of printed pages for respective sizes and color and monochrome print processes can be cited. In addition to the number of printed pages, various resources such as charges, toner consumption amounts, the number of times of use of applications, and the like can be cited as examples. An output unit 111 of the MFP 104 has a function of outputting printouts according to a print job.

Note that an apparatus which executes the print process is not limited to the MFP, but a printer or copying machine may be used.

[Upper Limit Setting and Distribution Setting]

Figure 4:
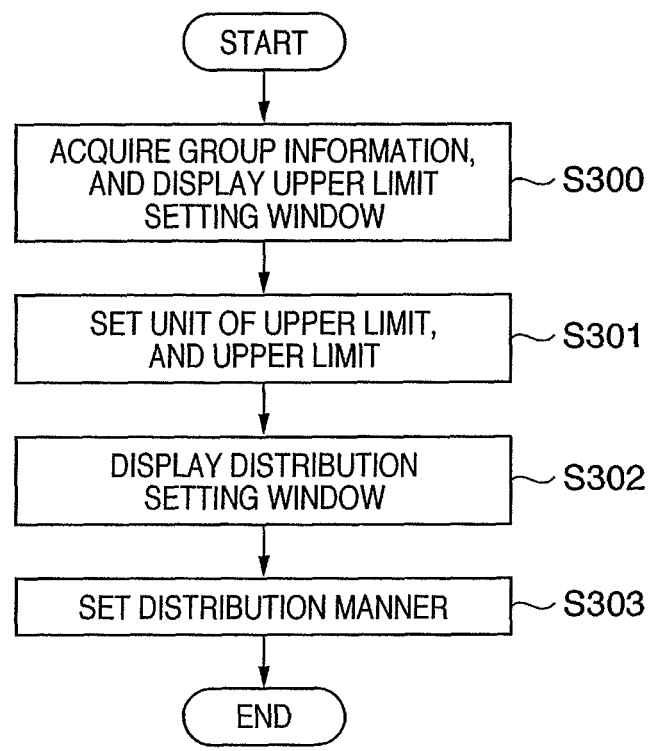
FIG. 4 is a flowchart showing the upper limit setting and distribution setting sequence.

FIG. 4 is a flowchart showing the upper limit setting and distribution setting sequence.

The result management server 101 acquires group information from the directory server 102 in accordance with an instruction of the system administrator input via the UI 105, and displays an upper limit setting window on the UI 105 (S300). The group information corresponds not to a group corresponding to a specific user identifier (to be described later) but to every group managed by the system irrespective of user identifiers.

FIG. 5 shows an example of the upper limit setting window. FIG. 5 shows the upper limit setting window for group "Product 1-1" extracted from the group information acquired in step S300. In practice, settings are made for respective groups acquired in step S300, but a description about "Product 1-1" alone will be given below.

The system administrator sets a unit of upper limit and upper limit for the group which is to undergo result management. The unit of upper limit can be selected from "total page count", "color/monochrome-dependent page counts", and "charge". If "page counts of single sided print/both sides print" or the like is added as a unit of upper limit, the upper limit settings can be made in more detail. The system administrator inputs an upper limit according to the type of the selected unit of upper limit. The example of FIG. 5 shows a state in which the system administrator selects "total page count" as a unit of upper limit, and inputs "2000" pages as an upper limit.

The result management server 101 inputs the unit of upper limit and the upper limit set by the system administrator to the group displayed on the UI 105. When the system administrator presses an OK button on the upper limit setting window, the result management server 101 stores the unit of upper limit and the upper limit input to the upper limit setting window in a predetermined area of the directory server 102 in association with the group (S301).

Next, the result management server 101 displays a window used to set the result distribution manner of the group (distribution setting window) on the UI 105 (S302). The system administrator sets, using the distribution setting window, a result distribution manner indicating how to distribute amounts when the user designates, as a result appropriating destination, a group for which the upper limit is not directly set and a group having a plurality of lower groups. Note that the result appropriating destination means a group to which the execution results of jobs designated by the user are to be appropriated.

Figure 6:
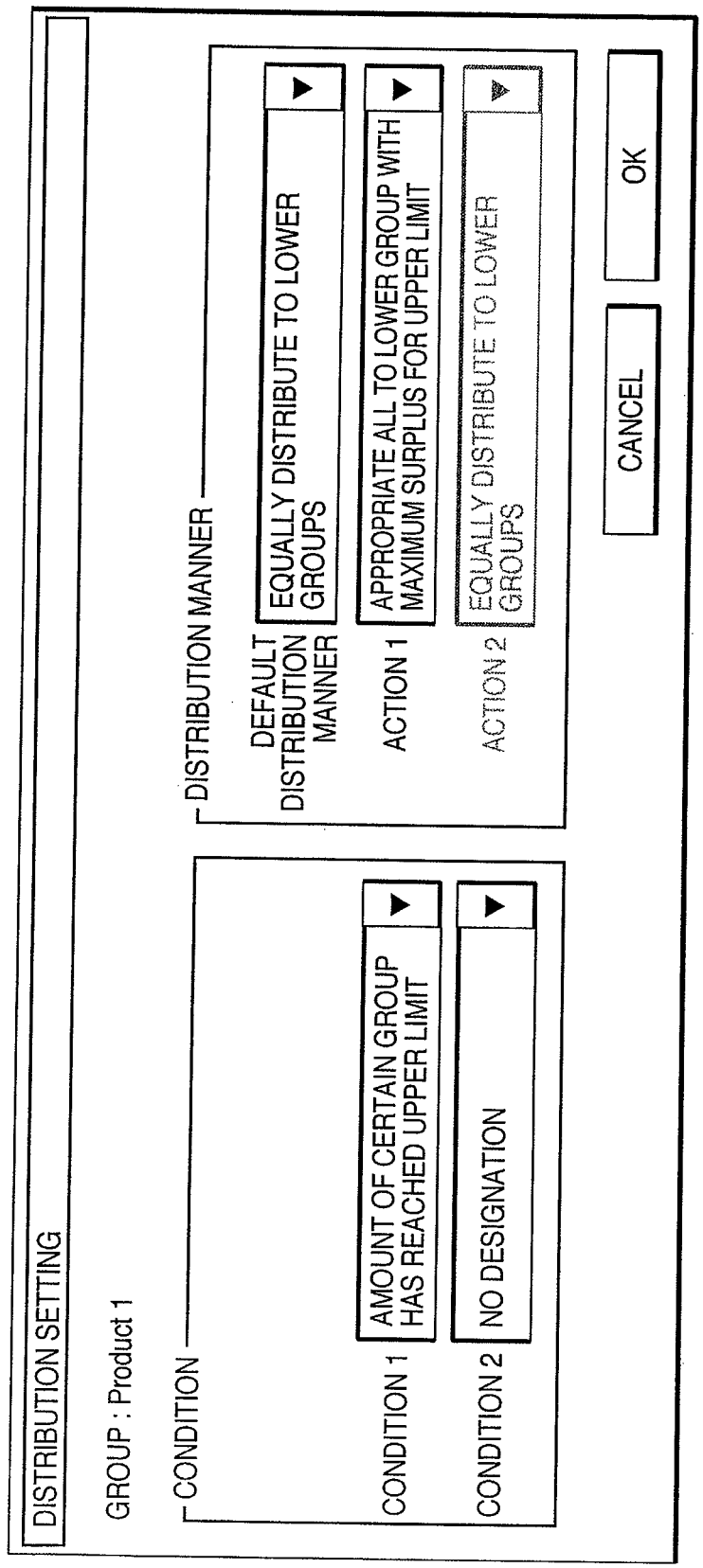
FIG. 6 shows an example of a distribution window.

FIG. 6 shows an example of the distribution setting window. Note that the distribution setting window shown in FIG. 6 is sequentially displayed for each of groups for which the upper limits are not directly set, and groups having a plurality of lower groups, in practice. A case will be explained as an example wherein the result distribution manner for group "Product 1" is set.

A plurality of result distribution manners can be set, and a result distribution manner (action) can be set for each condition. FIG. 6 shows a window example used to set conditions 1 and 2. Furthermore, condition 3 and subsequent conditions can be set.

For example, assume that the system administrator wants to make the following settings. That is, when the user designates, as a result appropriating destination, a group for which the upper limit is not set, an amount is equally distributed to lower groups of the designated group initially. As a result of distribution, if the amount of a certain lower group exceeds the upper limit, a lower group with a maximum surplus for the upper limit is changed to the result appropriating destination.

In this case, the system administrator selects "equally distribute to lower groups" from a drop-down list of a text box of "default distribution manner". Then, the system administrator selects "amount of certain group has reached upper limit" from a drop-down list of a text box of "condition 1". Furthermore, the system administrator selects "appropriate all to group with maximum surplus for upper limit" from a drop-down list of a text box of "action 1" corresponding to "condition 1".

Moreover, the system administrator selects "no designation" from a drop-down list of a text box of "condition 2". "Condition 1" is checked in priority to "condition 2". That is, when "condition 1" is not applicable, "condition 2" is checked. When "no designation" is set in "condition 2", if "condition 1" is not applicable, the default distribution manner is executed. Therefore, the default distribution manner "equally distribute to lower groups" is automatically input to a text box of "action 2" corresponding to "condition 2".

Note that the drop-down lists of the distribution manners, conditions, and actions are prepared in advance in the result management system. The system administrator selects proper ones from the distribution manners, conditions, and actions, which are prepared in advance. For example, the drop-down lists of the distribution manners and actions include:

equally distribute to lower groups;
appropriate all to a lower group with a maximum surplus for the upper limit
distribute according to the ratio of surpluses for the upper limit;
appropriate all to a lower group with a minimum amount;
distribute according to the distribution ratio of the past amount of the user; and so forth.

Also, for example, the drop-down list of the conditions includes:

the amount of a certain group has reached the upper limit;
the surplus of a certain group for the upper limit reaches a predetermined ratio;
the past amount of the user reaches a predetermined value; and so forth.

The past amount of the user can be acquired from, for example, log data managed by the result management server 101.

Upon pressing of the OK button on the distribution setting window, the result management server 101 stores the distribution manner, conditions, and actions input to the distribution setting window in a predetermined area of the directory server 102 in association with the group (S303).

Note that in FIG. 4 and the above description, the upper limit settings for one group and the distribution settings for one group have been explained. However, the system administrator repeats the upper limit settings and distribution settings for groups that require settings.

In the example of the above description, the unit of upper limit is set for each group via the upper limit setting window in FIG. 5, and the result distribution manner is set for each group via the distribution setting window in FIG. 6. However, the present invention is not limited to such specific mode. For example, when the unit of upper limit and result distribution manner are allowed to be commonly set for a plurality of groups, more flexible settings can be made. In this case, when the upper limit settings need be made for each group, the setting window shown in FIG. 5 may be used.

[Result Management]

Designate Result Appropriating Destination

Figure 7:
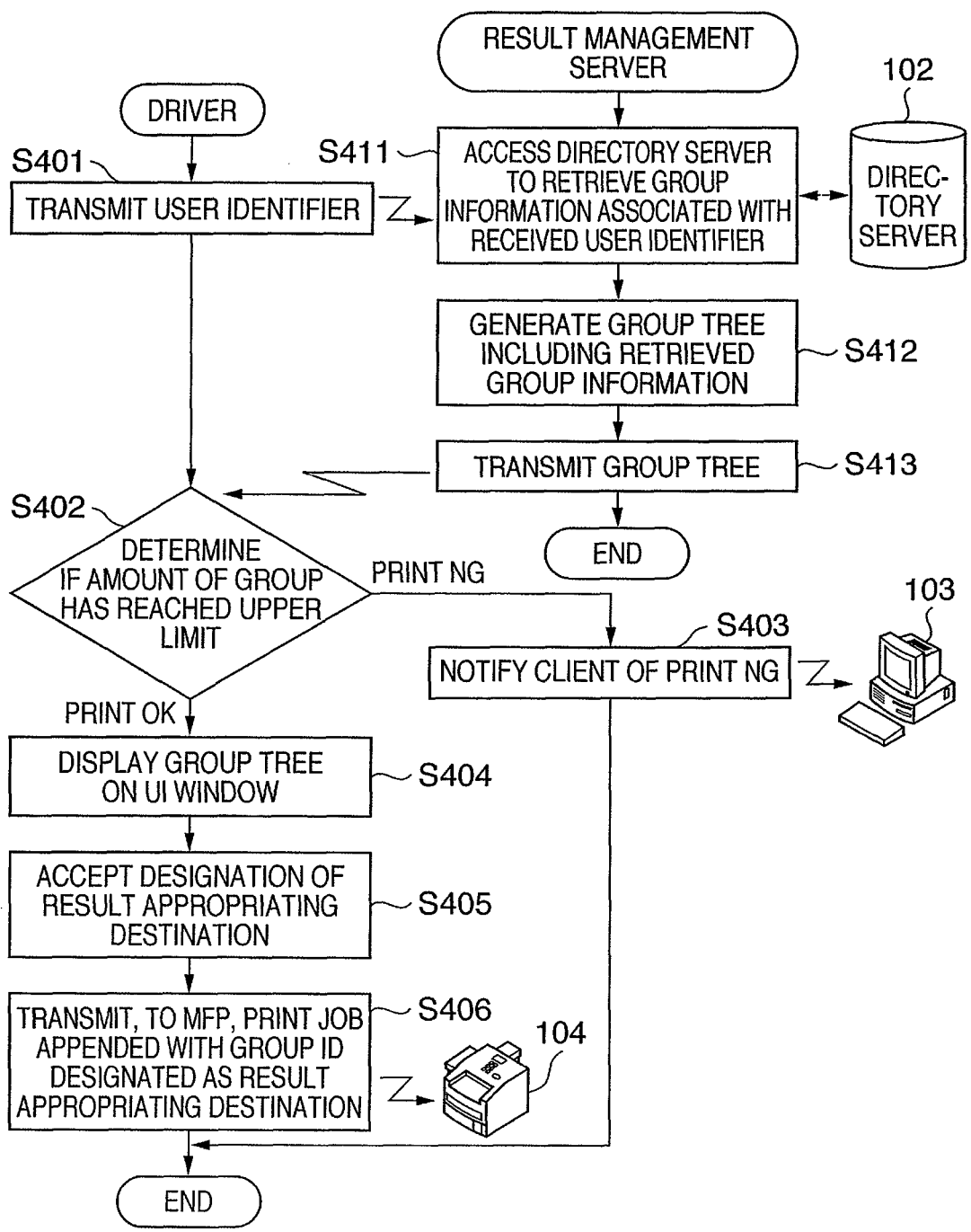
FIG. 7 is a flowchart for explaining the designation method of a result appropriating destination.
Figure 8:
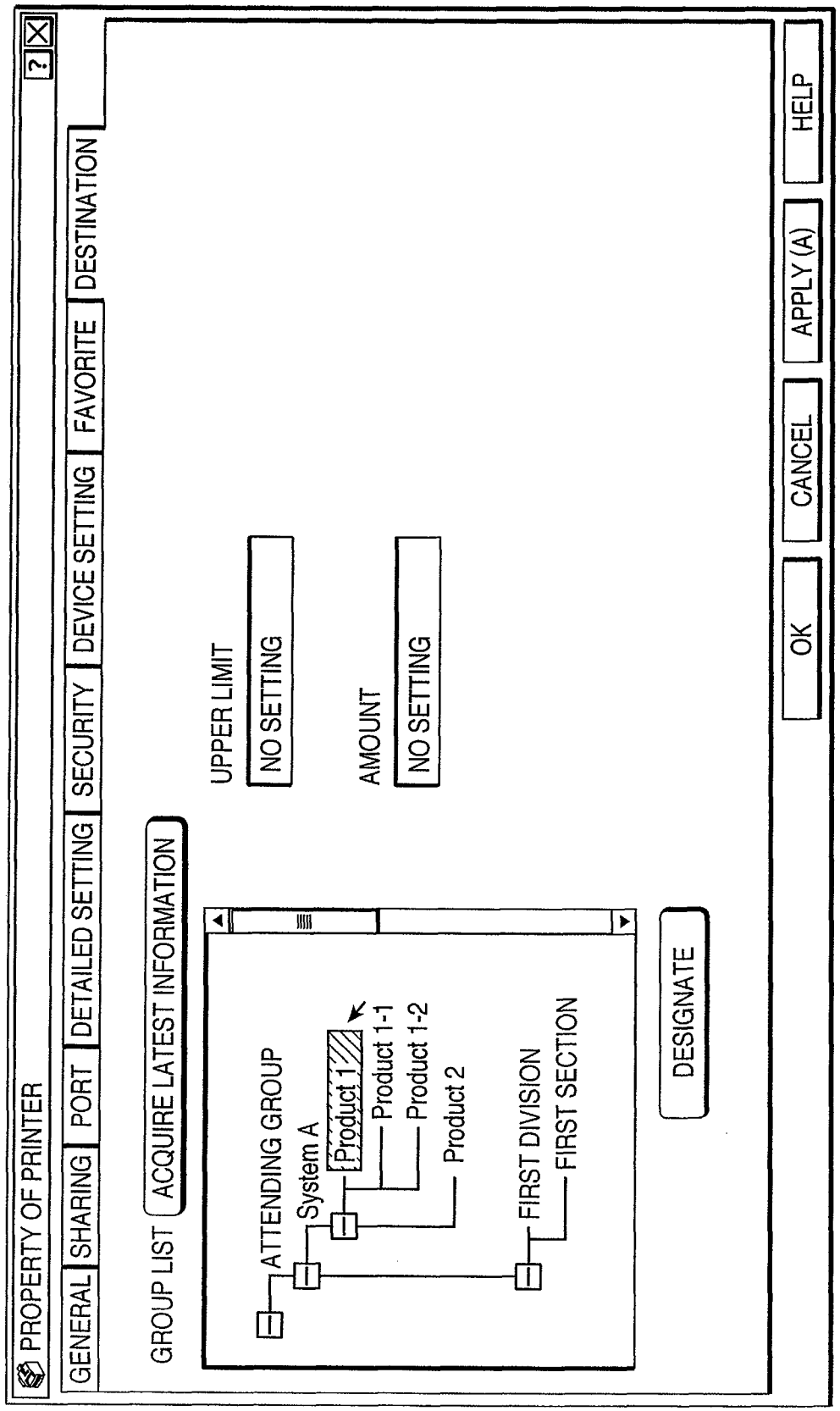
FIG. 8 shows a UI window example of a driver.

FIG. 7 is a flowchart for explaining the designation method of a result appropriating destination. That is, FIG. 7 shows the processes to be executed by the driver 107 and result management server 101 upon issuing a print job to the MFP 104 when the user manipulates the UI provided by the driver 107 of the client 103. FIG. 8 shows a UI window example of the driver 107. The UI shown in FIG. 8 serves as a designation window used to designate the result appropriating destination according to the user.

When the user selects a "destination" tag corresponding to the result appropriating destination on the UI window and presses an "acquire latest information" button, the driver 107 of the client 103 transmits an identifier (e.g., User001) of that user to the result management server 101 (S401). The user identifier can be derived from a login name used when the user logs in the client 103.

The result management server 101 accesses the directory server 102 to retrieve group information associated with the received user identifier (the user identifier as user information transmitted by the driver 107 in step S401) (S411). The group information associated with the user identifier indicates one or a plurality of groups that the user can designate as a result appropriating destination. The result management server 101 then generates a group tree including the retrieved group information (S412). The group information retrieval and group tree generation sequence will be described later using the flowchart of FIG. 10. Then, the result management server 101 transmits the generated group tree to the driver 107 (S413). The group tree includes only groups that can be designated as a result appropriating destination. The phrase "including only groups that can be designated" indicates various cases such as a method that does not display any groups that cannot be designated, a method that displays groups that cannot be displayed, but does not allow the user to select them on the UI, and the like. The groups that can be designated as a result appropriating destination are those for which the user is set as a member, that is, groups for which upper limits are set, and an upper group of these groups.

Upon reception of the group tree from the result management server 101, the driver 107 checks with reference to the received group information if the amounts of groups in the group tree have reached the upper limits (S402). Note that the details of the checking method will be described later with reference to FIGS. 9A and 9B. If the amounts of all the groups that can be designated have reached upper limits, the driver 107 determines that the print process cannot be executed, and notifies the client 103 of that message (S403), thus ending the processing. The client 103 that receives the message from the driver 107 in step S403 displays a warning message indicating that the print process cannot be executed on its display unit.

FIGS. 9A and 9B show examples of group information held by the directory server 102.

The group information includes a group identifier (ID), group name (name), upper group ID (memberOf), lower group ID (member), upper limit (limit), amount (amount), and the like. The driver 107 checks based on the upper limit and amount included in the group information if the amount has reached the upper limit. Note that the result management server 101 may check whether or not the amount has reached the upper limit, and may notify the driver 107 of that result, thus further reducing the processing load on the driver 107.

Next, the driver 107 displays the group tree on the UI window (S404). In this case, the driver 107, for example, grays out a group whose amount is determined to have reached the upper limit, so as to indicate that the group cannot be designated as a result appropriating destination. As the display control method of the driver 107 indicating that a certain group cannot be designated as a result appropriating destination, after a group is selected by a user's instruction, a warning message is displayed to invalidate the user's choice.

When the user has selected a group from the group tree on the UI window (the user has selected "Product 1" in the display example of FIG. 8), the UI window displays the upper limit and amount of the selected group. In the example of FIG. 8, since group "Product 1" is not set with an upper limit as a result appropriating destination, the upper limit and amount are displayed as "no setting".

If the user presses a "designate" button, the driver 107 accepts the designation of a result appropriating destination (S405). Furthermore, if the user presses an "OK" button, the driver 107 transmits a print job appended with a group ID corresponding to the group designated as the result appropriating destination to the MFP 104 (S406). This group ID is used when the result management server specifies a group as a plurality of result appropriating destinations later.

Note that the driver 107 stores the designation of the result appropriating destination according to the login user of the client 103. Therefore, the driver 107 issues a print job to have the group (group ID), which is designated in step S405 and is saved for each user, as the result appropriating destination unless the user changes the designation of the result appropriating destination.

Retrieval of Group and Generation of Group Tree

Figure 10:
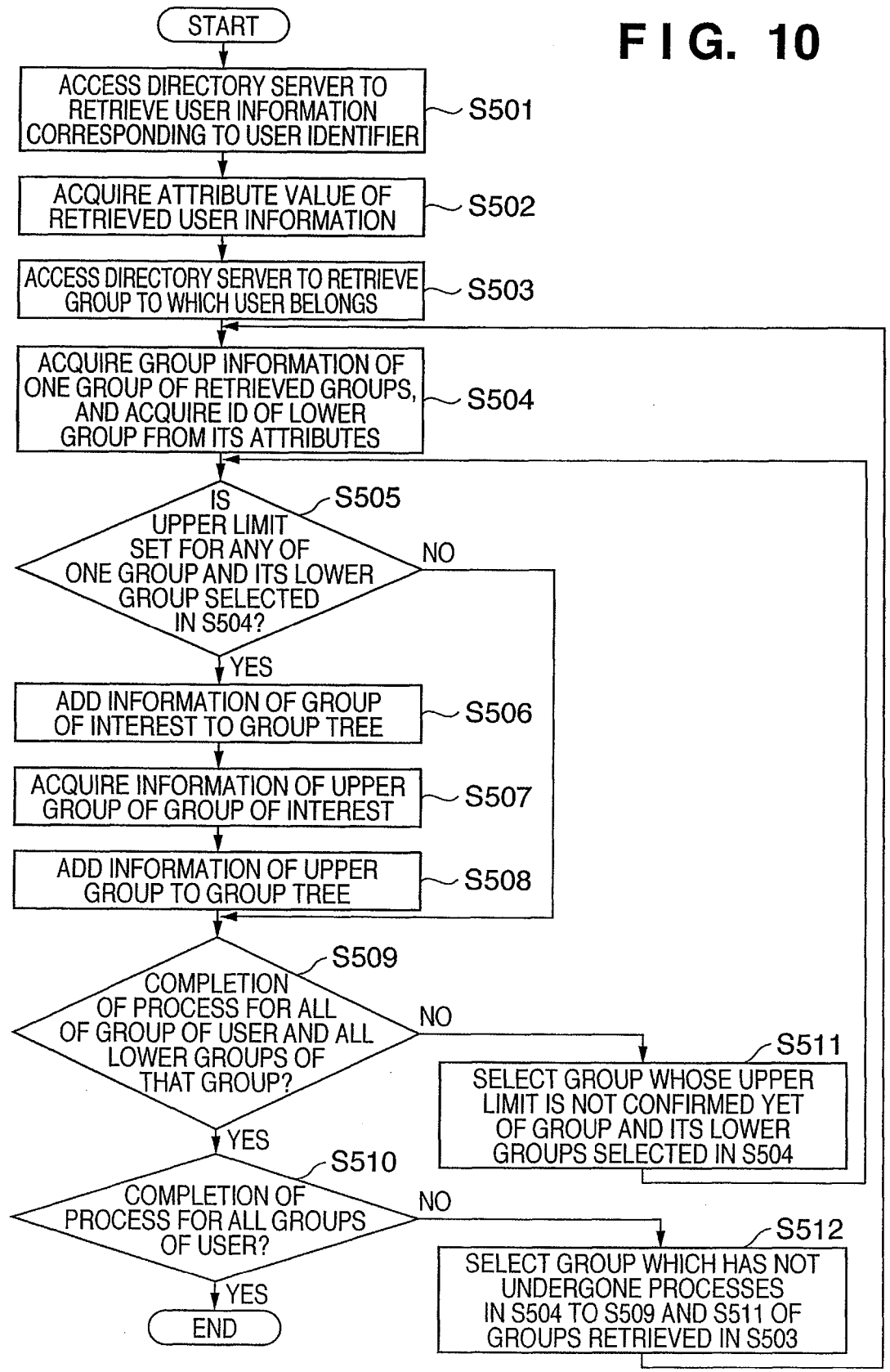
FIG. 10 is a flowchart for explaining the group information retrieval and group tree generation sequence by a result management server.

FIG. 10 is a flowchart for explaining the sequence for retrieving group information of the appropriating destination of the execution results of Jobs and generating a group tree by the result management server 101. That is, FIG. 10 shows details of the processes in steps S411 and S412 in FIG. 4 described above.

The result management server 101 accesses the directory server 102 to retrieve user information corresponding to the user identifier, which is derived from, for example, the login name uniquely determined for each login user (S501). The result management server 101 then acquires the attribute values of the retrieved user information (S502).

FIG. 11 shows an example of the user information held by the directory server 102.

The user information holds, as attributes, information indicating a user ID (ID), the user identifier (name) used in step S501, a group to which the user belongs (memberOf), and the like. The example shown in FIG. 11 indicates that the user information with user identifier "User001" includes a user ID "U0000001", and IDs "G0000015" and "G0021000" of the groups to which the user belongs.

The result management server 101 then accesses the directory server 102 to retrieve groups to which the user belongs (S503). In this example, the result management server 101 retrieves groups with the group IDs "G0000015" and "G0021000". As can be seen from the group information shown in FIGS. 9A and 9B, the group ID "G0000015" indicates "System A", and the group ID "G0021000" indicates "First Section".

The result management server 101 acquires group information of one of the groups retrieved in step S503, and acquires the group IDs (member) of lower groups (S504). In this example, the result management server 101 selects "System A" of the retrieved groups ("System A" and "First Section") first, and acquires the group IDs of lower groups of "System A". Assume that "product 1", "Product 1-1", "Product 1-2", and "Product 2" are retrieved as lower groups of "System A", as shown in FIG. 3. Upon completion of the process for "System A", the result management server 101 executes the same process for "First Section" as the other group. In this case, there is no lower group of "First Section", as shown in FIG. 9B.

The result management server 101 checks the reference attributes of any one of the group and its lower groups selected in step S504 so as to see if an upper limit is set for that group (S505). If no upper limit is set, the process jumps to step S509. If an upper limit is set, the result management server 101 adds the information of that group to a group tree (S506), acquires information of an upper group of that group (S507), and adds the information of the upper group to the group tree (S508).

With the above processes, for example, if the result management server 101 selects "Product 1-1" in step S505, since the upper limit of "Product 1-1" is set to be "2000" in the example shown in FIG. 3, it adds the group information of "Product 1-1" to the group tree. Also, the result management server 101 adds information of "Product 1" as the upper group of "Product 1-1" to the group tree.

The result management server 101 checks if the processes in steps S505 to 508 are complete for all of one group and its lower groups selected in step S504 (S509). If groups to be processed still remain, the result management server 101 the result management server 101 selects a group to be processed of one group and its lower groups selected in step S504 (S511), and the process returns to step S505 to repeat the processes in steps S505 to S508 to that group. If the result management server 101 the result management server 101 determines in step S509 that the processes are complete for all the groups, the process advances to step S510.

In the example of the above description, as the upper group retrieval method, only one parent (upper group) of lower groups is traced. However, the upper group retrieval method is not limited to this. For example, a group may be traced to the uppermost group.

Also, there is an upper group having only one lower group set with an upper limit. In this case, even when the user designates that upper group, it practically means that he or she designated that lower group, and the lower group may be excluded from the group tree. The result management server 101 may confirm user's authority to groups, and may add only groups that he or she has authority for designating them as a result appropriating destination to the group tree.

The result management server 101 checks if the processes in steps S504 to S509 and S511 are complete for all the groups retrieved in step S503 (S510). If a group to be processed still remain, the result management server 101 selects a group to be processed of those retrieved in step S503 (S512), and the process returns to step S504 to repeat the processes in steps S504 to S509 and S511 for the selected group. If the result management server 101 determines in step S510 that the processes are complete, it ends the generation of the group tree.

With the above processes, the group tree shown in FIG. 8 is built. The information of the group tree built by the flowchart in FIG. 10 is transmitted to the driver 107.

Print Process

Figure 12:
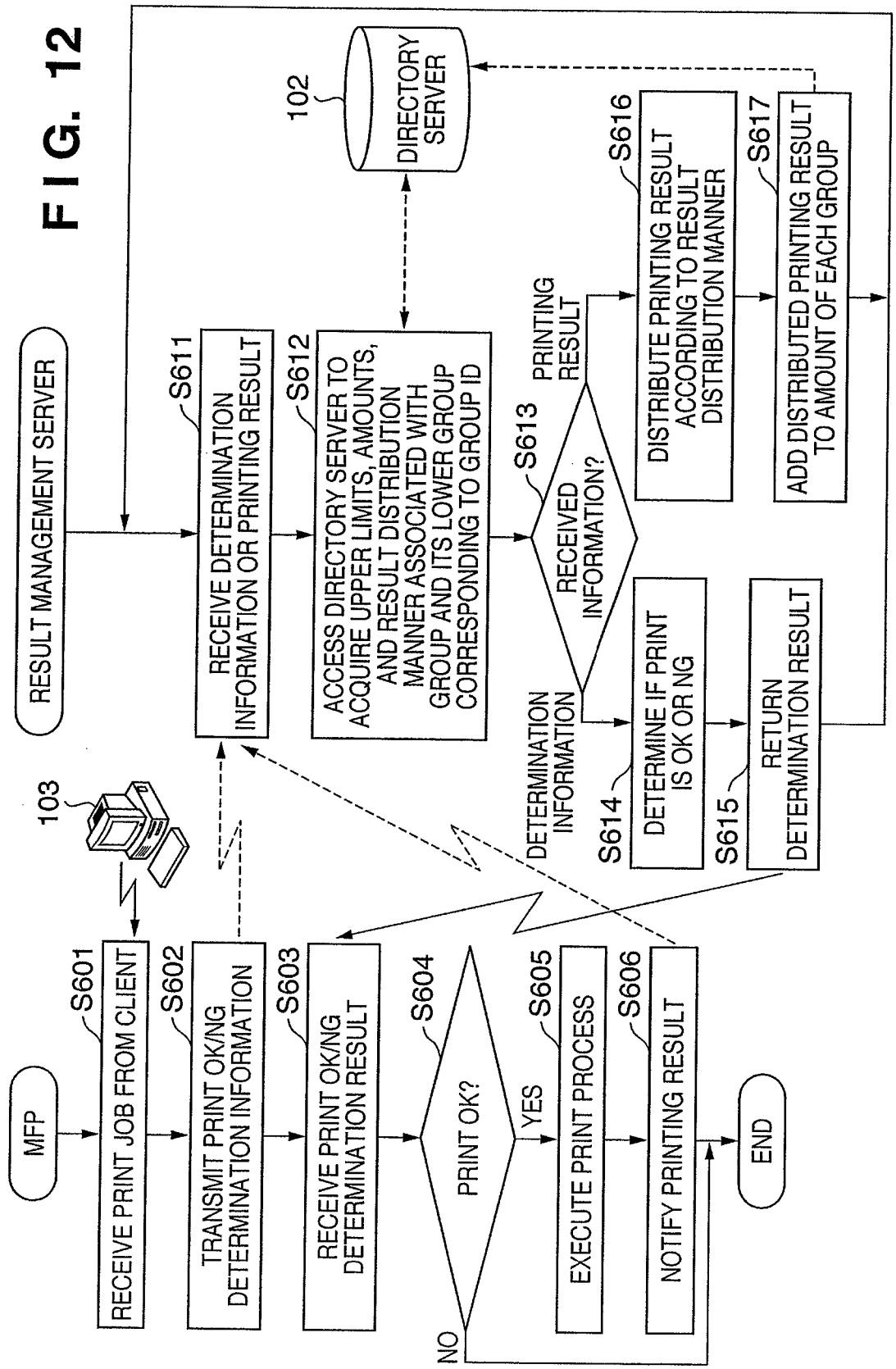
FIG. 12 is a flowchart for explaining the processes to be executed by an MFP and the result management server when the MFP receives a print job.

FIG. 12 is a flowchart for explaining the processes to be executed by the MFP 104 and result management server 101 when the MFP 104 receives a print job.

The MFP 104 receives, from the client 103, a print job which is transmitted by the driver 107 in step S406 in FIG. 7 (S601). Processes to be executed when the MFP 104 receives a printing result will be described later. In response to reception of the print job in step S601, the result confirmation module 109 transmits print OK/NG determination information to the result management server 101 (S602). Note that the determination information means information used to determine print OK or NG on the result management server 101 side. This determination information includes the group ID, the number of pages to be printed, information associated with color/monochrome print, and the like. Note that the group ID corresponds to the group ("Product 11" in the display example of FIG. 8) which is designated by the user as a result appropriating destination in step S405 in FIG. 7.

Upon reception of the determination information (S611), the result management server 101 acquires the upper limit, amount, and result distribution manner associated with a group and lower groups specified by the group ID (S612). If the received information is the determination information (S613), the result management server 101 determines based on the acquired upper limit, amount, and result distribution manner if the print process is OK or NG (S614). The result management server 101 sends back the determination result in step S614 to the MFP 104 (S615), and the process returns to step S611.

Upon reception of the print OK/NG determination result from the result management server 101 (S603), the MFP 104 determines if the received determination result indicates that the print process is OK (S604). Whether the print process is OK or NG is determined by checking based on the upper limit and amount included in the group information if the amount has reached the upper limit. If the amount has reached the upper limit, it is determined that the print process is NG. Also, when the group designated in step S602 has already been deleted, the determination result of the result management server 101 indicates print NG.

If it is determined that the print process is OK, the MFP 104 executes the print process using the output unit 111 (S605), and notifies the result management server 101 of a printing result using the result collection module 110 (S606), thus ending the print process. The printing result is appended with the group ID of the result appropriating destination designated by the user in step S405 in FIG. 7. Note that the group ID of the result appropriating destination means information indicating result appropriating destinations used to specify a plurality of groups (users and departments) to which the printing result is appropriated, and formats other than the group ID are applicable as long as they indicate the similar information.

On the other hand, if print NG is determined (e.g., all the groups as the result appropriating destinations have reached the upper limits), the MFP 104 cancels the print job and notifies the client 103 of this (S607), thus ending the print process.

The result management server 101 receives the printing result appended with the information of a plurality of result appropriating destinations sent by the MFP 104 in step S606 (S611). The result management server 101 accesses the directory server 102 based on the information of the result appropriating destination appended to the printing result to acquire the upper limit, amount, and result distribution manner associated with a group corresponding to the group ID and one or a plurality of lower groups (S612). If the received information is the printing result (S613), the result management server 101 distributes the printing result based on the acquired upper limit, amount, and result distribution manner (S616). The printing result distribution process will be described later with reference to FIG. 13. The result management server 101 adds the distributed printing result to the amount of each group and stores the sum in the directory server 102 (S617). After that, the process returns to step S611.

Distribution Process

In the following description, assume that the user designates upper group "Product 1" as a result appropriating destination, and instructs execution of a print job for 300 pages. Also, assume that the amount and upper limit of "Product 1-1" as a lower group of "Product 1" are respectively 1900 pages and 2000 pages, and those of "Product 1-2" are respectively 200 pages and 1000 pages. Furthermore, assume that the result distribution manner acquired by the result management server 101 in step S612 is set as follows:

default distribution manner: equally distribute to lower groups;

condition 1: the amount of a certain group has reached the upper limit;

action 1: appropriate all to a lower group with a maximum surplus for the upper limit; and condition 2: no designation.

Figure 13:
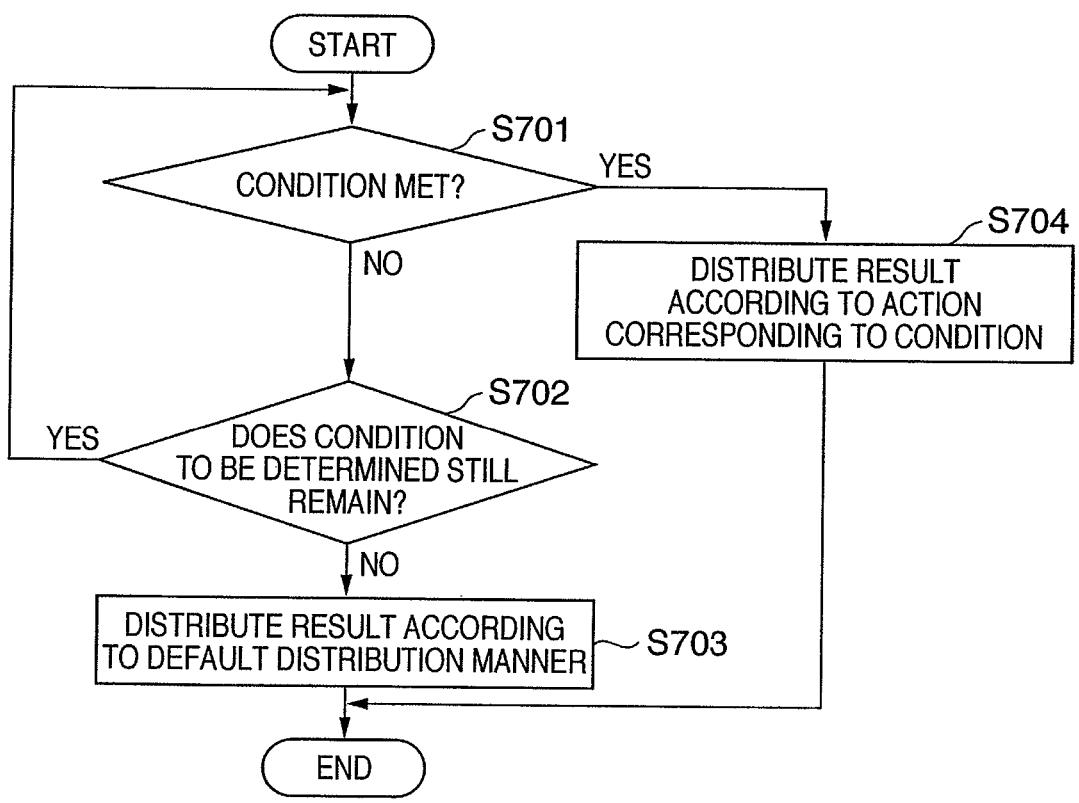
FIG. 13 is a flowchart for explaining the distribution process by the result management server.

FIG. 13 is a flowchart for explaining the distribution process by the result management server 101 in step S616 in FIG. 12.

The result management server 101 checks if "condition 1" is met when the default distribution manner is applied to the current amounts of the group and its lower groups corresponding to the group ID received in step S611 to add the result (S701). Since the result appropriating destinations are lower groups "Product 1-1" and "Product 1-2" having upper limits, it is checked if their amounts have reached the upper limits when 150 pages are respectively distributed to "Product 1-1" and "Product 1-2".

If it is determined in step S701 that the condition is not met, the result management server 101 checks if conditions to be determined still remain (S702). If conditions to be determined still remain, the process returns to step S701 to check if the condition to be determined is met when the result is respectively distributed to the lower groups. If no condition to be determined remains, the result management server 101 distributes the result to the plurality of lower groups based on the upper group according to the default distribution manner (S703).

If it is determined in step S701 that the condition is met, the result management server 101 distributes the result according to an action corresponding to that condition (S704).

Under the above assumptions, when the result of 150 pages is distributed to "Product 1-1", the amount becomes 2050 pages, and has exceeded the upper limit of 2000 pages. Therefore, the result management server 101 determines that the amount of "Product 1-1" has reached the upper limit, and the determination result in step S701 indicates that the condition is met. Then, the result management server 101 appropriates the result of all 300 pages to "Product 1-2" in step S704. If the number of printed pages is 100 pages, since the result of 50 pages is respectively distributed, the amounts of "Product 1-1" and "Product 1-2" do not reach the upper limits. In this case, the result management server 101 respectively distributes the result of 50 pages to "Product 1-1" and "Product 1-2" in step S703.

In this way, upon execution of the print process associated with a plurality of groups, the user can designate an upper group of the plurality of groups as a result appropriating destination. Then, according to the result distribution manner set for the group as the result appropriating destination, the result is appropriately distributed to the lower groups. Therefore, the billing control, upper limit control, and result totaling of print processes associated with a plurality of groups can be accurately executed.

Modification of First Embodiment

In the above description, whether or not the condition is met is determined in the order of conditions 1, 2, . . . . Alternatively, priority levels may be assigned to respective conditions, and whether or not each condition is met may be determined. Then, if a plurality of conditions are met, an action corresponding to the condition with high priority may be made.

If a situation that meets the condition is revealed during the print process, the result distribution manner may be changed when that condition is met, or the whole result may be distributed based on that condition. For example, a print process for 200 pages is executed to have group "product 1" as a result appropriating destination. Assume that the surplus for the upper limit of lower group "Product 1-1" before the print process is 50 pages, and that of "Product 1-2" is 400 pages.

With one method, the result is equally distributed to "Product 1-1" and "Product 1-2" initially according to the default distribution setting. When the amount of "Product 1-1" has reached the upper limit, since the condition "the amount of a certain group has reached an upper limit" is met, the remaining result is appropriated to "Product 1-2".

With another method, since it is revealed during the print process that the condition "the amount of a certain group has reached an upper limit" is met, action 1 is applied from the beginning to appropriate the whole result to "Product 1-2".

Second Embodiment

Information processing according to the second embodiment of the present invention will be described hereinafter. Note that the same reference numerals in the second embodiment denote the same components as those in the first embodiment, and a detailed description thereof will not be given.

The second embodiment will explain a case wherein the user gives the instruction to execute a print process using the UI 108 of the MFP 104 when he or she wants to copy a document placed on a document table of the MFP 104 or when he or she wants to process a print job saved in an internal hard disk of the MFP 104.

Figure 14:
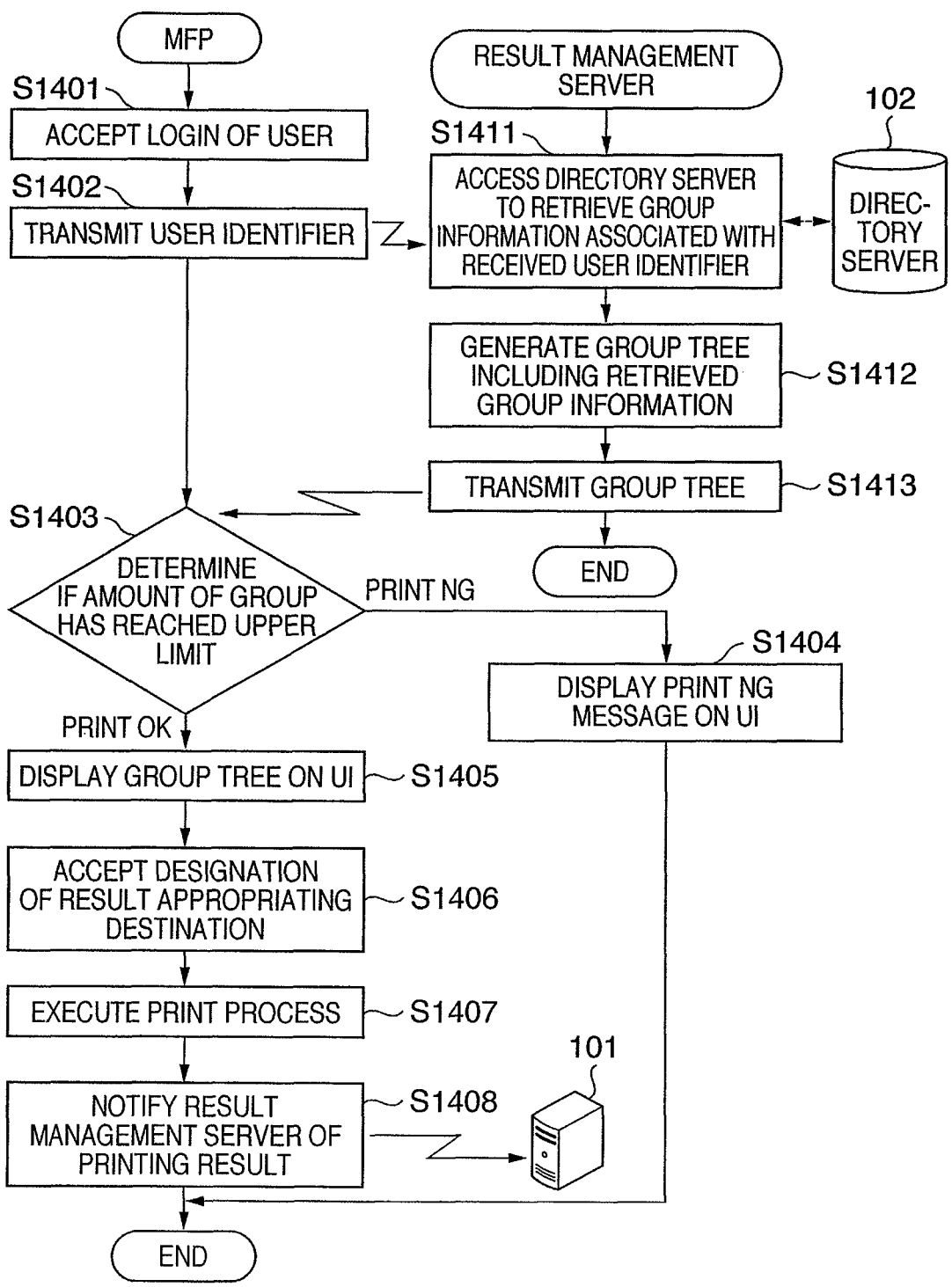
FIG. 14 is a flowchart for explaining the processes to be executed by the MFP and result management server when the user gives the instruction for a print process on a UI of the MFP.

FIG. 14 is a flowchart for explaining the processes to be executed by the MFP 104 and result management server 101 when the user instructs to execute a print process using the UI 108 of the MFP 104.

The MFP 104 accepts the login access of the user (S1401), and transmits the user identifier (e.g., User001) to the result management server 101 (S1402). Note that the user logs in the MFP 104 by inputting the login name and password to the UI 108. The user identifier can be derived from the login name or the like.

The result management server 101 accesses the directory server 102 to retrieve group information associated with the received user identifier (S1411), and generates a group tree including the retrieved group information (S1412). The result management server 101 then transmits the generated group tree to the MFP 104 (S1413). Note that the group tree generation method is the same as that in the description of the flowchart of FIG. 10 of the first embodiment.

Upon reception of the group tree, the MFP 104 determines with reference to the group information if the amounts of groups in the group tree have reached their upper limits (S1403). Note that the determination method is the same as that in the description of FIGS. 9A and 9B of the first embodiment. If the amounts of all the groups have reached the upper limits, the MFP 104 determines that the print process is NG, and displays a message that advises accordingly on the UI 108 (S1404), thus ending the processing.

If the MFP 104 determines that the print process is OK, it displays the group tree on the UI 108 (S1405). In this case, the MFP 104 grays out a group whose amount is determined to have reached the upper limit, so as to indicate that the group cannot be designated as a result appropriating destination.

If the user selects a group using the UT 108, the MFP 104 accepts the designation of a result appropriating destination (S1406). Furthermore, if the user presses a print start button on the operation panel, the MFP 104 executes a print process (S1407), and notifies the result management server 101 of the printing result using the result collection module 110 (S1408), thus ending the print process. The printing result is appended with the group ID of the result appropriating destination designated by the user in step S1406. Note that the result distribution process in the result management server 101 is the same as that in the description of FIGS. 12 and 13 of the first embodiment.

In the example of the above description, the output process is made using the printer function and copy function of the MFP 104. Also, this embodiment can be applied to result management to be executed when the scanner function, FAX function, and the like of the MFP 104 are used.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-298215, filed Nov. 1, 2006, which is hereby incorporated by reference herein in its entirety.

What is claimed is:

1. An information processing apparatus comprising:
   a holding section arranged to hold information of user groups in a memory, wherein the information of user groups is used to distribute an execution result of a job of an image forming apparatus;
   a retrieving section arranged to retrieve, from the memory, a plurality of designatable user groups which can be designated by a user as an appropriating destination of the execution result of the job in accordance with information of the user input from an external apparatus;
   a transmitting section arranged to transmit information of the plurality of designatable user groups to the external apparatus based on the retrieval result;
   a receiving section arranged to receive, from the image forming apparatus, the execution result of the job appended with result appropriating destination information required to specify a plurality of user groups to which the execution result of the job is to be appropriated; and
   a distributing section arranged to distribute a value corresponding to the execution result of the job to the plurality of user groups specified by the result appropriating destination information appended to the received execution result of the job such that a sum of a distribution value to each user group, to which the execution result of the job is to be distributed, equals to the value corresponding to the execution result of the job,
   wherein the external apparatus displays a designation window of the appropriating destination of the execution result of the job based on the information of the plurality of designatable user groups, generates the result appropriating destination information based on a user instruction designated on the designation window, and transmits a print job appended with the result appropriating destination information to the image forming apparatus,
   wherein the receiving section receives the execution result of the job appended with the result appropriating destination information from the image forming apparatus which has executed the print job received from the external apparatus.

2. The information processing apparatus according to claim 1, wherein the information of the plurality of designatable user groups includes information of an upper group, and information of at least one lower group associated with the upper group, and the external apparatus generates the result appropriating destination information based on the upper group designated via the designation window.

3. The information processing apparatus according to claim 1, wherein the information of the plurality of designatable user groups includes information of an upper group, and information of at least one lower group associated with the upper group, and the result appropriating destination information indicates the upper group.

4. The information processing apparatus according to claim 3, further comprising a specifying section arranged to specify a lower group associated with the upper group based on the upper group indicated by the result appropriating destination information,
   wherein the distributing section distributes the execution result of the job to the lower group specified by the specifying section.

5. The information processing apparatus according to claim 3, further comprising a setting section arranged to set an upper limit of the execution result of the job that can be appropriated for each lower group.

6. The information processing apparatus according to claim 3, further comprising a setting section arranged to set a unit of upper limit and an upper limit of the execution result of the job that can be appropriated for each lower group.

7. The information processing apparatus according to claim 3, further comprising a setting section arranged to set a distribution manner used to distribute the execution result of the job to the lower group associated with the upper group.

8. The information processing apparatus according to claim 3, further comprising:
   a first setting section, arranged to set an upper limit of the execution result of the job that can be appropriated for each lower group;
   a second setting section, arranged to set a distribution manner used to distribute the execution result of the job to the lower group associated with the upper group; and
   a determining section arranged to determine whether or not an amount of the execution result of the job distributed to the lower group associated with the upper group indicated by the result appropriating destination information reaches the upper limit,
   wherein the distributing section distributes the execution result of the job based on the determination and the distribution manner.

9. An information processing method comprising:
   using a processor to perform the steps of:
   holding, in a memory, information of user groups used to distribute an execution result of a job of an image forming apparatus;
   retrieving, from the memory, a plurality of designatable user groups which can be designated by a user as an appropriating destination of the execution result of the job in accordance with information of the user input from an external apparatus;

transmitting information of the plurality of designatable user groups to the external apparatus based on the retrieval result;

receiving, from the image forming apparatus, the execution result of the job appended with result appropriating destination information required to specify a plurality of user groups to which the execution result of the job is to be appropriated; and distributing a value corresponding to the execution result of the job to the plurality of user groups specified by the result appropriating destination information appended to the received execution result of the job such that a sum of a distribution value to each user group, to which the execution result of the job is to be distributed, equals to the value corresponding to the execution result of the job, wherein the external apparatus displays a designation window of the appropriating destination of the execution result of the job based on the information of the plurality of designatable user groups, generates the result appropriating destination information based on a user instruction designated on the designation window, and transmits a print job appended with the result appropriating destination information to the image forming apparatus, wherein, in the receiving step, the execution result of the job appended with the result appropriating destination information is received from the image forming apparatus which has executed the print job received from the external apparatus.

10. A non-transitory computer-readable medium storing a computer-executable program causing a computer to perform the information processing method according to claim 9.

11. The information processing apparatus according to claim 1, wherein the distributing comprises dividing the value corresponding to the execution result of the job and supplying the divided value corresponding to the execution result of the job to the plurality of user groups specified by the result appropriating destination information.

12. The information processing method according to claim 9, wherein the distributing comprises dividing the value corresponding to the execution result of the job and supplying the divided value corresponding to the execution result of the job to the plurality of user groups specified by the result appropriating destination information.

* * * * *